United States Patent [19]

Pfeiffer et al.

[11] Patent Number: 5,044,084
[45] Date of Patent: Sep. 3, 1991

[54] ANGLE SENSOR ELEMENT

[75] Inventors: Walter Pfeiffer, Pliezhausen; Horst Laucht, Bruckmuehl; Hans Spies, Pfaffenhofen, all of Fed. Rep. of Germany

[73] Assignee: Messerschmitt-Boelkow-Blohm GmbH, Munich, Fed. Rep. of Germany

[21] Appl. No.: 397,482

[22] PCT Filed: Nov. 18, 1988

[86] PCT No.: PCT/EP88/01048
§ 371 Date: Aug. 9, 1989
§ 102(e) Date: Aug. 9, 1989

[87] PCT Pub. No.: WO89/05438
PCT Pub. Date: Jun. 15, 1989

[30] Foreign Application Priority Data

Dec. 10, 1987 [DE] Fed. Rep. of Germany ....... 3741821

[51] Int. Cl.$^5$ .................. G08C 19/10; G01B 11/26
[52] U.S. Cl. .................. 33/1 PT; 33/1 N
[58] Field of Search ............ 33/1 N, 1 PT, 534, 600; 73/862.34, 862.32; 250/231.13, 231.14, 231.18

[56] References Cited

U.S. PATENT DOCUMENTS 4,347,748  9/1982  Pierson .
4,614,869  9/1986  Hoshino et al. ............... 250/231.14
4,625,411  12/1986  Kashinagi et al. ............... 33/1 N X
4,627,297  12/1986  Akimoto .

FOREIGN PATENT DOCUMENTS 2928155  1/1981  Fed. Rep. of Germany .
0153518  7/1986  Japan ............................ 33/600
2065897  7/1981  United Kingdom .

Primary Examiner—Harry N. Haroian
Attorney, Agent, or Firm—W. G. Fasse; D. H. Kane, Jr.

[57] ABSTRACT

A goniometric device for measuring an angle such as the angle of rotation of the steering wheel in a motor vehicle is useful for providing a backlash-free reduction ratio of the angular movement to be measured. For this purpose an elastic torque rod is used to one end of which the angular movement is applied and the other end of which is rigidly fixed. The angular movement of a tap is taken off at a tap location between the two ends. The reduction ratio depends on the ratio between the two distances from the tap to both ends of the torque rod.

6 Claims, 1 Drawing Sheet

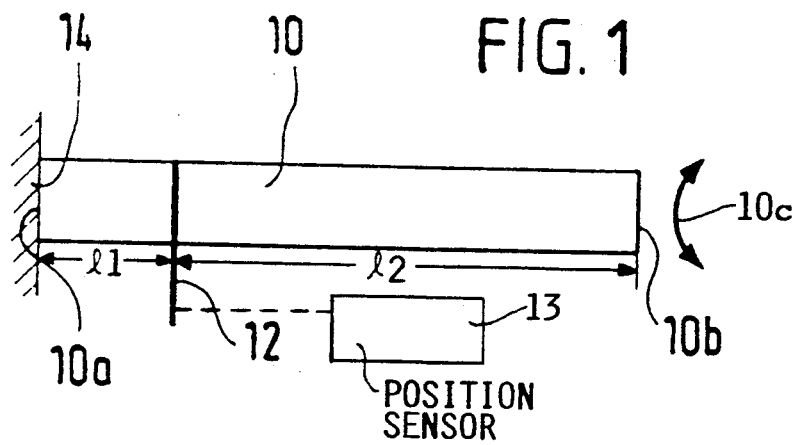
FIG. 1
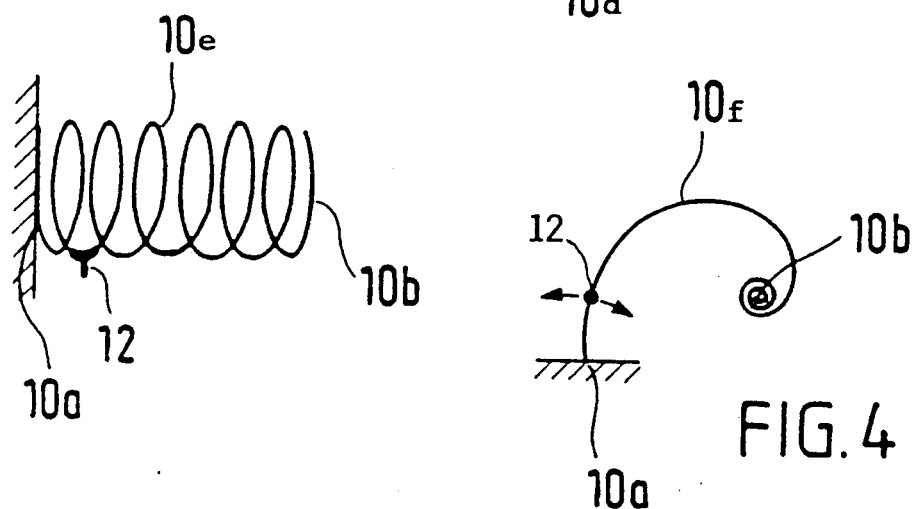
FIG. 2
FIG. 3
FIG. 4
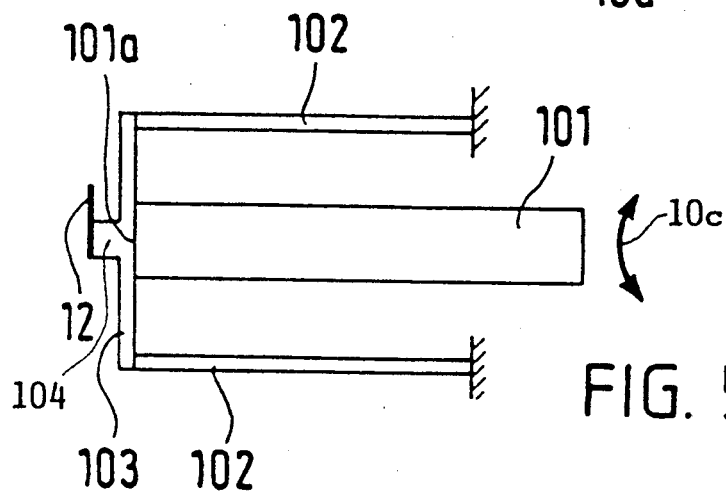
FIG. 5 ined with reference to specific example embodiments it will be appreciated that it is intended to cover all modifications and equivalents within the scope of the appended claims.

ANGLE SENSOR ELEMENT

FIELD OF THE INVENTION

The invention relates to an angle sensor element for sensing a rotational angle so that a measured angle has a fixed relationship with the actual angle to be measured.

BACKGROUND OF THE INVENTION

Angle sensor elements are known as such in most varied constructions. These known constructions, however, have as a rule only one definite indication for a single revolution or for a small angular range in a given rotational direction. However, for angular measurements or encodings, for example, of the steering angle of the steering wheel of a motor vehicle, it is necessary to make a measurement over several revolutions while maintaining a reliable, definite indication in one or the other rotational directions of the steering wheel. Even though only a few revolutions are involved, the problem of a definite directional indication so far could be solved only by an electronic coding of the revolution number or by using a mechanical gear drive free of play. In the first instance it is necessary to at least use one buffer battery. In the second instance the mechanical and material effort and expense are relatively high.

OBJECTS OF THE INVENTION

It is the object of the invention to provide an angle sensor element that makes possible a reliable scaling down of a rotational movement for a measuring range of a few revolutions without much effort and expense, whereby a definite indication must be provided for both rotational directions.

SUMMARY OF THE INVENTION

An angle sensor of the present invention is characterized in that an elastic element is rigidly clamped with one of its ends to a fixed reference point. The free end takes up the rotational movement. A tap is arranged between the clamped end and the free end at a location determined by the required reduction ratio, whereby a scaling down free of play of the rotational movement is achieved. The respective angular position of the tap and elastic element is indicated by mechanical, optical, electrostatic or other suitable devices.

BRIEF DESCRIPTION OF THE DRAWINGS

Example embodiments will now be described with reference to the accompanying drawings, wherein:

FIG. 1 is a schematic side view of an elastic angle sensor of the invention in the form of a torsion bar with a tap so located that a reduction ratio of 1:4 is obtained;

FIG. 2 is a perspective view of a torsion elastic torsion bar which is simultaneously stiff against bending loads and thus especially suitable for the present purposes;

FIG. 3 is a schematic illustration of another example embodiment of a torsion elastic element in the form of a helical spring;

FIG. 4 is a schematic illustration of still another example embodiment of a torsion elastic element in the form of a spiral spring; and FIG. 5 is a schematic illustration of an example embodiment in which the elastic element is divided by a tap.

DETAILED DESCRIPTION OF PREFERRED EXAMPLE EMBODIMENTS AND OF THE BEST MODE OF THE INVENTION

The angle sensor element shown in FIG. 1 comprises an elastic rod 10 and a tap 12 secured to the rod 10 at a location in accordance with the required reduction ratio. This elastic rod 10 is rigidly clamped with one of its ends 10a at a measuring reference plane 14, for example, at the steering wheel drive linkage.

The free end 10b of the rod 10 takes up rotational movement as shown by the double arrows 10c. The rotational movement may be applied to the free end 10b, for example, by a steering wheel not shown, whereby the rod 10 is exposed to a torsion load causing the tap 12 to be respectively rotated through an angular range the angle of which is picked up, measured, and evaluated by a mechanical, optical, electrostatic or other suitable device 13 and methods known as such. In this manner the imposed rotational movement of the rod 10 is ascertained in a manner free of play and with a definite reduction ratio. In FIG. 1 the reduction ratio is 11 to 12 or about 1:4.

FIG. 2 shows a rod 10d which has a cross-profile or cross-section whereby the rod 10d is torsion elastic and simultaneously bending stiff. Such a torsion rod is preferably used as an elastic element for the pick-up to provide reduction ratios of rotational movements. The reduction ratios are the more free of play the more bending stiff the rod is.

FIG. 3 illustrates an example embodiment in which the elastic element is constructed as a helical spring 10e. Again the fixed end 10a of the spring is rigidly clamped, and the other end 10b is freely floating. Application of the torque to the free end 10b of the spring 10e rotates the tap 12 along an arc the angle of which is evaluated as described above for giving a measured angular value at a reduction ratio which also depends on the position of the tap 12 between the ends 10a, 10b.

In the example embodiment according to FIG. 4, a spiral spring 10f serves as the elastic element. The arrangement corresponds substantially to that of FIG. 3.

FIG. 5 illustrates schematically a triple torsion stiff angle sensor, as compared to the above described construction. In FIG. 5 the elastic rod 101 is rigidly mounted with its end 101a to a rigid plate 103 of metal or of synthetic material having the required strength. This plate 103 is provided with the tap 12 and sits either on two rigidly clamped elastic rod elements 102 or on one elastic cylinder 104 as shown. In this embodiment the dimensions, the selection of the material, and the arrangement of the component will depend on the desired or required torsion stiffness of the device and on the desired reduction ratio.

Although the invention has been described with reference to specific example embodiments it will be appreciated that it is intended to cover all modifications and equivalents within the scope of the appended claims.

We claim:

1. A sensor for sensing an angular movement, comprising a torsion elastic means for taking up torque, mounting means for rigidly securing one end of said torsion elastic means, said torsion elastic means having a free end for taking up a torque applied to said free end for twisting said torsion elastic means about its longitudinal axis, a tap secured to said torsion elastic means intermediate the fixed end and said free end in such a position that a ratio between the lengths from said tap to both ends provides a fixed reduction ratio indication of said angular movement, and means for sensing an angular excursion of said tap out of a rest position.

2. The sensor of claim 1, wherein said torsion elastic means is a rod that is simultaneously bending stiff.

3. The sensor of claim 1, wherein said torsion elastic means is constructed as a helical spring.

4. The sensor of claim 1, wherein said torsion elastic means is constructed as a spiral spring.

5. The sensor of claim 1, wherein said torsion elastic means comprise a plurality of interconnected rods, and wherein said tap is located substantially where said rods are interconnected.

6. The sensor of claim 1, wherein said torsion elastic means is a rod having a cross-shaped cross-section.

* * * * *